United States Patent
Ishimoto et al.

(10) Patent No.: US 6,996,006 B2
(45) Date of Patent: Feb. 7, 2006

(54) SEMICONDUCTOR MEMORY PREVENTING UNAUTHORIZED COPYING

(75) Inventors: Shinichi Ishimoto, Tokyo (JP); Yoshikazu Miyawaki, Hyogo (JP); Shinji Kawai, Hyogo (JP); Atsushi Ohba, Hyogo (JP)

(73) Assignees: Renesas Technology Corp., Tokyo (JP); Renesas Solutions Corporation, Tokyo (JP)

( * ) Notice: Subject to any disclaimer, the term of this patent is extended or adjusted under 35 U.S.C. 154(b) by 17 days.

(21) Appl. No.: 10/873,253

(22) Filed: Jun. 23, 2004

(65) Prior Publication Data

US 2004/0264262 A1 Dec. 30, 2004

(30) Foreign Application Priority Data

Jun. 25, 2003 (JP) .............................. 2003-181377

(51) Int. Cl.
*G11C 16/04* (2006.01)

(52) U.S. Cl. ................... 365/185.04; 365/195; 713/183

(58) Field of Classification Search ........... 365/189.07, 365/185.04, 195; 713/183, 189

See application file for complete search history.

(56) References Cited

U.S. PATENT DOCUMENTS

| | | | |
|---|---|---|---|
| 6,320,787 B1 * | 11/2001 | Ikeda | 365/185.04 |
| 2003/0154355 A1 * | 8/2003 | Fernandez | 711/163 |
| 2003/0174844 A1 * | 9/2003 | Candelore | 380/277 |
| 2004/0128523 A1 * | 7/2004 | Fujioka | 713/189 |
| 2004/0170060 A1 * | 9/2004 | Ishimoto | 365/185.25 |
| 2005/0005131 A1 * | 1/2005 | Yoshida et al. | 713/183 |

FOREIGN PATENT DOCUMENTS

| | | |
|---|---|---|
| JP | 03-73043 | 3/1991 |
| JP | 11-203206 | 7/1999 |
| JP | P2001-5729 | 1/2001 |

* cited by examiner

*Primary Examiner*—Anh Phung
*Assistant Examiner*—Hien Nguyen
(74) *Attorney, Agent, or Firm*—McDermott Will & Emery LLP

(57) ABSTRACT

A memory mat is provided separately from a memory mat that is a normal memory area, and data therein cannot be read from the outside. In a page buffer, information input from the outside is stored. A comparing circuit compares security information stored in memory mat with information stored in page buffer, and the comparison result is output to the outside as a status. Even when unauthorized copying is performed, information in memory mat is not copied. Therefore, an external apparatus can easily determine whether or not the semiconductor memory is an unauthorized copy by referring to the status.

4 Claims, 6 Drawing Sheets

SEMICONDUCTOR MEMORY PREVENTING UNAUTHORIZED COPYING

BACKGROUND OF THE INVENTION

1. Field of the Invention

The present invention relates to a semiconductor memory such as a non-volatile memory, and specifically, to a semiconductor memory preventing unauthorized copying.

2. Description of the Background Art

In recent years, non-volatile memories are coming into wide use. Generally, from a non-volatile memory that permits random access, data written in the memory cells can be read, and therefore, unauthorized copying of the contents written in the non-volatile memory to another non-volatile memory is possible. As techniques for preventing such unauthorized copying, inventions are disclosed in Japanese Patent Laying-Open Nos. 11-203206, 2001-5729, and 3-73043.

In a security circuit of a non-volatile memory disclosed in Japanese Patent Laying-Open No. 11-203206, when information read by a read-out circuit indicates release of security, an output control part of the security circuit permits the data read by the read-out circuit to be output to the outside. When the information indicates a lock state of the security, it permits the data to be output to the outside if the data is detected to be all "0" by a first detection circuit at the time of program verify operation, or if the data is detected to be all "1" by a second detection circuit at the time of deletion verify operation.

In a non-volatile memory disclosed in Japanese Patent Laying-Open No. 2001-5729, a trap address is set in a password area. Reading from the password area is permitted only when an access is made not through the trap address. On the other hand, when an access is made by the trap address, reading from the password area is inhibited, a meaningless data is output, or the information in the password area is destroyed. Furthermore, the order of accessing to the password area can arbitrarily be set, such that reading from the password area is permitted only when an access is made in that set order. On the other hand, when an access is made in an order except for that set order, reading from the password area is inhibited, a meaningless data is output, or the information in the password area is destroyed.

In a data processing device disclosed in Japanese Patent Laying-Open No. 3-73043, a protection circuit made of a non-volatile memory element is provided, which has an extension prohibiting bit for setting whether the bus extension mode is prohibited or not and a protect bit for setting whether the data in the EPROM (Erasable and Programmable Read Only Memory) is made secret or not. It is configured such that the extension prohibiting bit is selected when a CPU (Central Processing Unit) mode is set. A read-out signal of the extension prohibiting bit is input to a mode control circuit, and when write is executed to the bit, a port is controlled so that the bus extension mode of the single chip microcomputer can be prohibited.

In a non-volatile memory not preventing unauthorized copying, data written in the memory cells can freely be read, and therefore, copying is easy if a ROM writer is used. Accordingly, there has been a problem that an unauthorized use by a person except for an authorized user is possible.

Furthermore, the above-mentioned patent documents only disclose inhibiting reading of the data stored in a non-volatile memory itself so that unauthorized copying is prevented. There may be a case, however, where copying of a non-volatile memory is permitted, while its operation only is desired to be inhibited.

SUMMARY OF THE INVENTION

An object of the present invention is to provide a semiconductor memory, which permits copying of the semiconductor memory but inhibits its operation to an unauthorized user.

According to one aspect of the present invention, a semiconductor memory includes: a specific storage area provided separately from a normal storage area and that is inaccessible to be read from outside; a buffer storing information input from the outside; a comparing portion comparing security information stored in the specific storage area with information stored in the buffer; and an output portion outputting a comparison result by the comparing portion to the outside as a status.

Even when unauthorized copying is performed, as information in the specific area is not copied, an external apparatus can easily determine whether or not the semiconductor memory is an unauthorized copy.

According to another aspect of the present invention, a semiconductor memory includes: a specific storage area provided separately from a normal storage area and that is inaccessible to be read from outside; a buffer storing information input from the outside; a comparing portion comparing security information stored in the specific storage area with information stored in the buffer; and a control portion stopping part of an operation of the semiconductor memory when matching is not detected by the comparing portion.

Even when unauthorized copying is performed, as information in the specific area is not copied, the normal operation of the semiconductor memory is not performed and therefore an unauthorized use can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
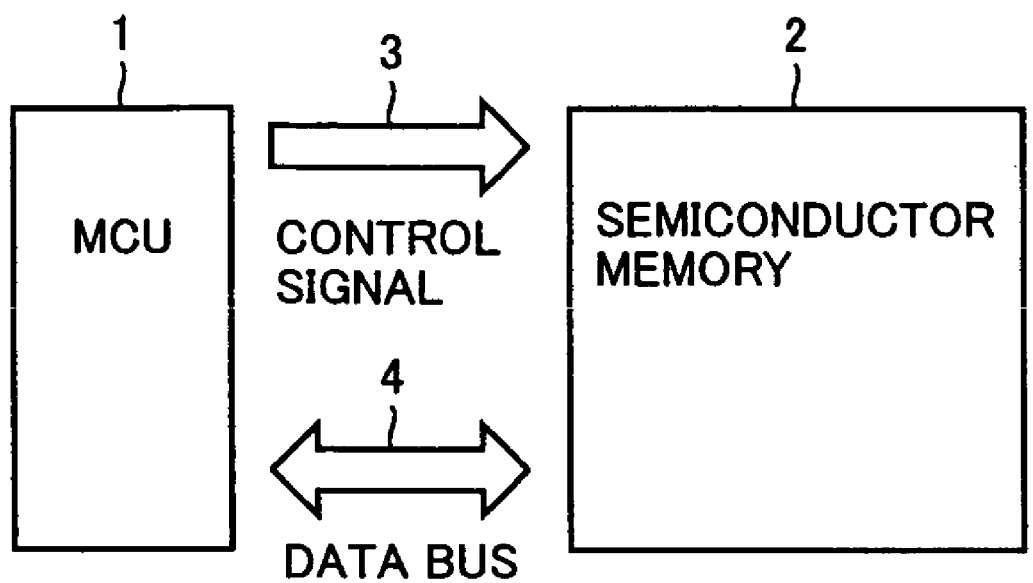
FIG. 1 is a block diagram showing a schematic configuration of a semiconductor memory apparatus according to a first embodiment of the present invention.

FIG. 1 is a block diagram showing a schematic configuration of a semiconductor memory apparatus according to a first embodiment of the present invention. The semiconductor memory apparatus includes a semiconductor memory 2, and an MCU (Micro Controller Unit) 1 performing control of data reading, data writing and the like to semiconductor memory 2. Semiconductor memory 2 is configured with a non-volatile memory such as a flash memory.

MCU 1 performs data writing/reading through data bus 4 by outputting a control signal 3 to semiconductor memory 2. MCU 1 contains ROM (Read Only Memory) and RAM (Random Access Memory) storing a program and the like, and performs processes such as data reading/writing to the semiconductor memory by executing the program stored in the memory.

Figure 2:
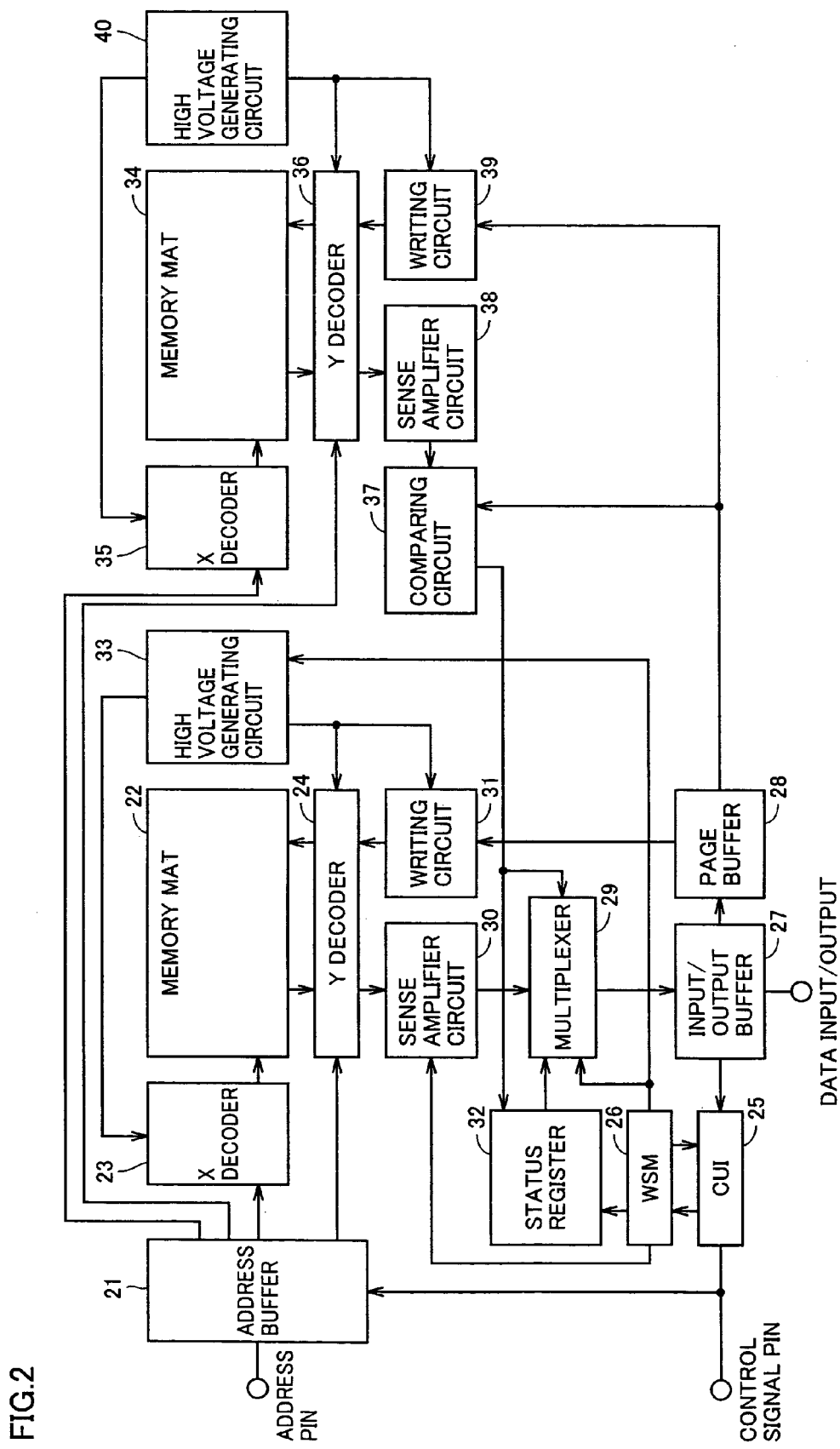
FIG. 2 is a block diagram showing a schematic configuration of semiconductor memory 2 according to the first embodiment of the present invention.

FIG. 2 is a block diagram showing a schematic configuration of semiconductor memory 2 according to the first embodiment of the present invention. Semiconductor memory 2 has an address buffer 21 retaining an address output from MCU 1, a memory mat 22 storing normal data, an X decoder 23 decoding the address retained in address buffer 21 and activating any word line of memory mat 22, a Y decoder 24 decoding the address retained in address buffer 21 and activating any bit line of memory mat 22, a CUI 25 performing control of data input/output and the like in response to control signal 3 received from MCU 1, a WSM (Write State Machine) 26 interpreting a command received from MCU 1 and performs overall control of semiconductor memory 2, an input/output buffer 27 retaining data input/output to/from MCU 1, a page buffer 28 retaining write data of one page, a multiplexer 29 selecting either data read from memory mat 22 or a status and output it to input/output buffer 27, a sense amplifier circuit 30 amplifying the read data from memory mat 22, a writing circuit 31 writing the data retained in page buffer 28 to memory mat 22, a status register 32 retaining a status, and a high voltage generating circuit 33 generating high voltage to be supplied to writing circuit 31 or the like. They are similar to the components of a general non-volatile memory (a flash memory).

Semiconductor memory 2 further includes a memory mat 34 permitting only data writing and storing information such as a password, an X decoder 35 decoding the address retained in address buffer 21 and activating any word line of memory mat 34, a Y decoder 36 decoding the address retained in address buffer 21 and activating any bit line of memory mat 34, a comparing circuit 37 comparing data read from memory mat 34 with the data retained in page buffer 28, a sense amplifier circuit 38 amplifying the read data from memory mat 34, a writing circuit 39 writing the data retained in page buffer 28 to memory mat 34, and a high voltage generating circuit 40 generating high voltage to be supplied to writing circuit 39 or the like. These are the components newly added in the first embodiment of the present invention.

As shown in FIG. 2, sense amplifier circuit 38 amplifying the read data from memory mat 34 is not connected to input/output buffer 27, and therefore, the data written to memory mat 34 will not be output to the outside.

When MCU 1 writes data such as a password to memory mat 34 (hereinafter also referred to as a specific area), MCU1 issues a specific area write dedicated command to semiconductor memory 2. The specific area write dedicated command is input to WSM 26 through input/output buffer 27 and CUI 25. When WSM 26 determines that the command is a specific area write dedicated command, it sequentially writes data output from MCU 1 to page buffer 28. When data of one page is written in page buffer 28, writing circuit 39 writes data stored in page buffer 28 to memory mat 34 through Y decoder 36.

When comparing the data written in the specific area with the data stored in page buffer 28, MCU 1 issues a specific area compare dedicated command to semiconductor memory 2. The specific area compare dedicated command is input to WSM 26 through input/output buffer 27 and CUI 25. When WSM 26 determines that the command is a specific area compare dedicated command, it reads data stored in memory mat 34. Comparing circuit 37 compares the data read from memory mat 34 with the data stored in page buffer 28, and the comparison result is stored in status register 32. MCU 1 can determine whether or not the data stored in specific area 34 and the data stored in page buffer 28 match, by reading the status stored in status register 32 through multiplexer 29 and input/output buffer 27.

Figure 3:
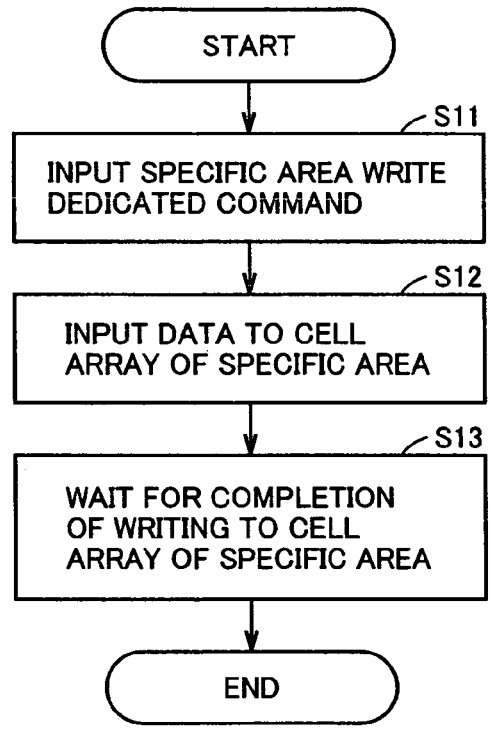
FIG. 3 is a flowchart for describing a process procedure of data writing to specific area 34 of the semiconductor memory apparatus according to the first embodiment of the present invention.

FIG. 3 is a flowchart for describing a process procedure of data writing to specific area 34 of the semiconductor memory apparatus according to the first embodiment of the present invention. First, when a specific area write dedicated command is input from MCU 1 (S11), the command is interpreted by WSM 26.

Next, data such as a password to be written to specific area 34 is output from MCU 1, and the data is sequentially stored in page buffer 28 (S12). As the command received from MCU 1 is a specific area write dedicated command, writing circuit 39 sequentially writes the data stored in page buffer 28 to memory mat 34. When writing to memory mat 34 is normally completed, MCU 1 reads the status stored in status register 32 and ends the process (S13).

Figure 4:
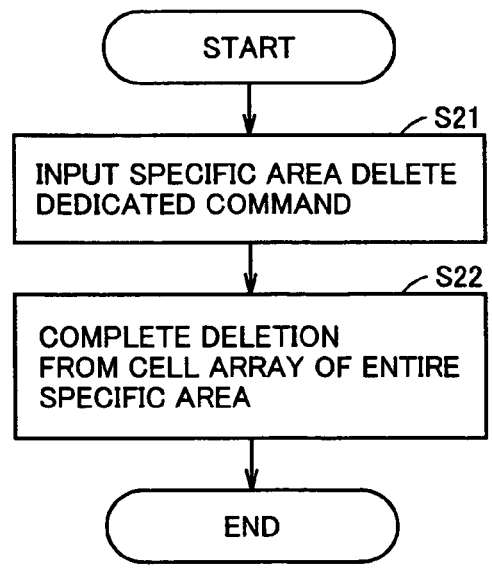
FIG. 4 is a flowchart for describing a process procedure of data deletion from specific area 34 of the semiconductor memory apparatus according to the first embodiment of the present invention.

FIG. 4 is a flowchart for describing a process procedure of data deletion from specific area 34 of the semiconductor memory apparatus according to the first embodiment of the present invention. First, when a specific area delete dedicated command is input from MCU 1 (S21), the command is interpreted by WSM 26.

As the command received from MCU 1 is a specific area delete dedicated command, writing circuit 39 starts data deletion from specific area 34. When data deletion from memory mat 34 is normally completed, MCU 1 reads the status stored in status register 32 and ends the process (S22).

Figure 5:
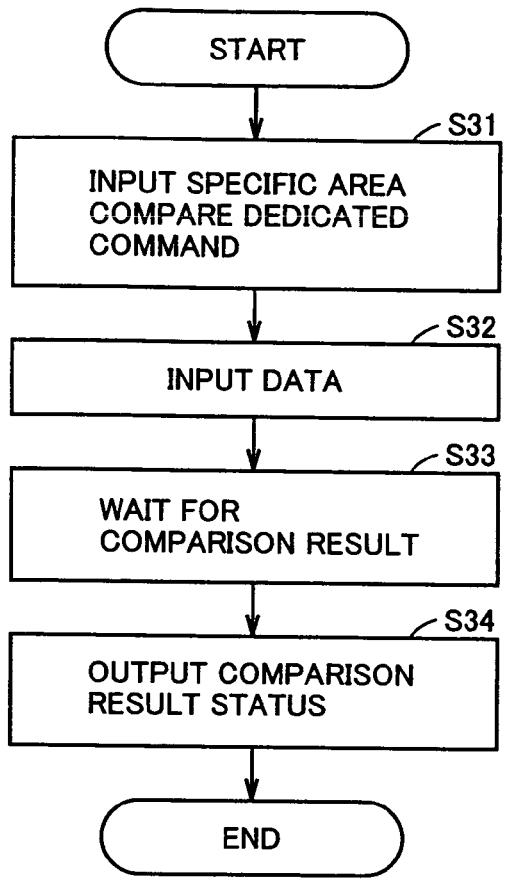
FIG. 5 is a flowchart for describing a process procedure of comparison of data stored in specific area 34 of the semiconductor memory apparatus according to the first embodiment of the present invention.

FIG. 5 is a flowchart for describing a process procedure of comparison of data stored in specific area 34 of the semiconductor memory apparatus according to the first embodiment of the present invention. First, when a specific area compare dedicated command is input from MCU 1 (S31), the command is interpreted by WSM 26.

Next, the data to be compared (that is input by the user, such as a password for authentication) is output from MCU 1, and the data is sequentially stored in page buffer 28 (S32).

As the command received from MCU 1 is a specific area compare dedicated command, comparing circuit 37 sequentially reads the data stored in specific area 34, and compares it with the data stored in page buffer 28, and the comparison result is stored as a status in the status register (S33).

Finally, the status stored in status register 32 is output to MCU 1 through multiplexer 29 and input/output buffer 27 (S34), and the process ends.

It should be noted that, the data to be compared that is stored in page buffer 28 is, for example, a personal password input by a user using a keyboard or the like. This personal password is registered in specific area 34 in advance, and authentication is performed by comparing the data stored in specific area 34 and the data stored in page buffer 28.

Figure 6:
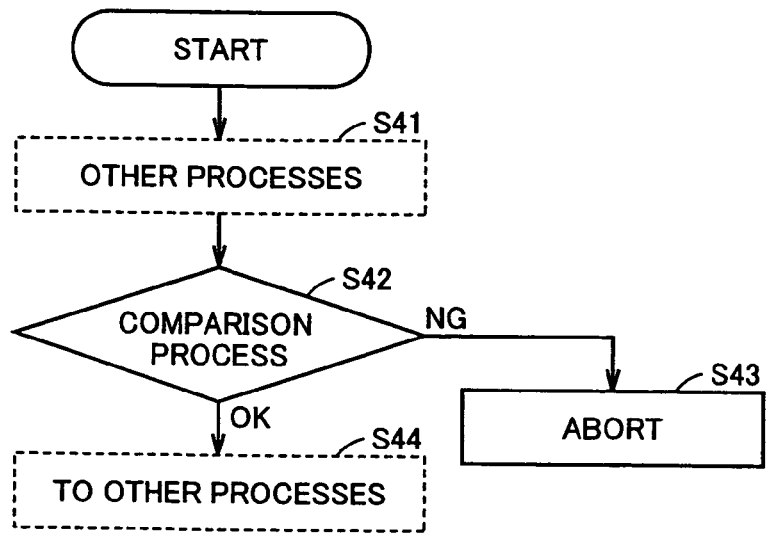
FIG. 6 is a flowchart for describing an actual usage example of the semiconductor memory apparatus according to the first embodiment of the present invention.

FIG. 6 is a flowchart for describing an actual usage example of the semiconductor memory apparatus according to the first embodiment of the present invention. In this process procedure, the comparison process of specific area 34 described above with reference to FIG. 5 is inserted, in order to determine during the process whether or not the access to semiconductor memory 2 is permitted.

First, MCU 1 performs other processes (S41), and when accessing semiconductor memory 2, it issues the specific area compare dedicated command to semiconductor memory 2. Semiconductor memory 2 performs the process shown in FIG. 5, and outputs a status to MCU 1. MCU 1 refers to the status received from semiconductor memory 2, and if matching of the contents of specific area 34 is not recognized, i.e., if authentication is failed (S42, NG), it aborts the process. On the other hand, if matching of the contents of specific area 34 is recognized, i.e., if authentication is succeeded (S42, OK), MCU 1 performs other processes (S44).

As above, as the contents of specific area 34 is not output to the outside, the contents (a password) of specific area 34 will not be copied to another semiconductor memory even when data stored in semiconductor memory 2 is copied to that semiconductor memory. Therefore, when MCU 1 performs the process shown in FIG. 6, it will receive a status indicating mismatching of the contents of specific area 34 from the semiconductor memory of an unauthorized copy. Hence, the processes that follow will not be performed. Thus, execution of the program stored in the semiconductor memory of an unauthorized copy can be prevented.

Additionally, it is also possible to configure semiconductor memory 2 such that when comparing circuit 37 detects mismatching of the contents of specific area 34, the operation of the semiconductor memory apparatus of an unauthorized copy is stopped by not accepting all or part of the commands from MCU 1.

As described above, according to the semiconductor memory apparatus according to the present embodiment, as comparing circuit 37 compares the data stored in specific area 34 with the data received from MCU 1 and stored in page buffer 28, and returns the comparison result to MCU 1 as a status, MCU 1 can determine whether or not the semiconductor memory is an unauthorized copy, and hence execution of the program stored in the semiconductor memory of an unauthorized copy can be prevented.

Second Embodiment

With the semiconductor memory apparatus according to the first embodiment of the present invention, by using the specific area write dedicated command and the specific area delete dedicated command, the data stored in specific area 34 can be overwritten. Therefore, unauthorized copying using these dedicated commands cannot be prevented. A semiconductor memory apparatus according to a second embodiment of the present invention has a further enhanced security function.

The schematic configuration of the semiconductor memory apparatus and the schematic configuration of the semiconductor memory according to the second embodiment of the present invention are similar to the schematic configuration of the semiconductor memory apparatus according to the first embodiment shown in FIG. 1 and the schematic configuration of the semiconductor memory 2 according to the first embodiment shown in FIG. 2, respectively. Therefore, detailed descriptions of identical configurations and functions are not repeated.

Figure 7:
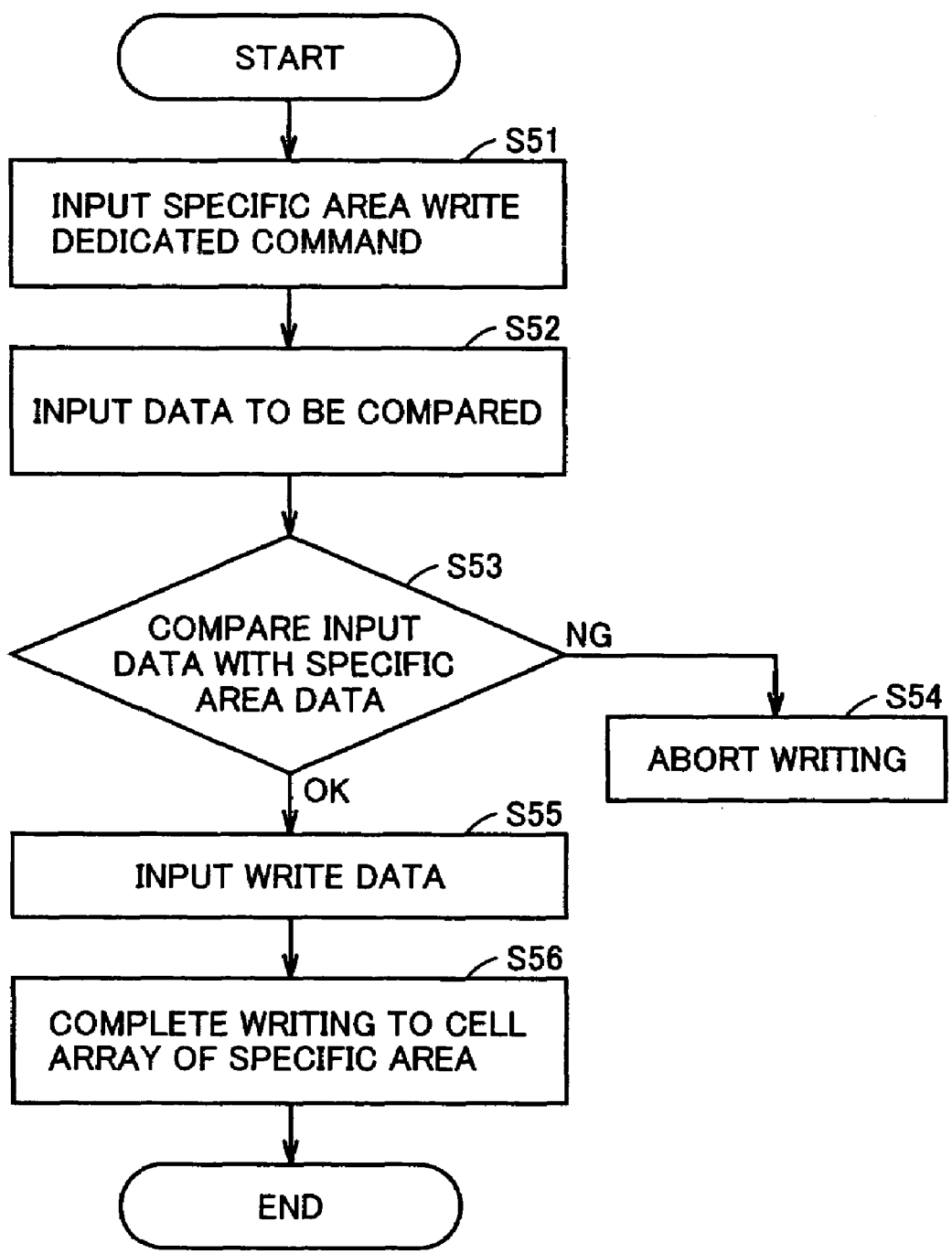
FIG. 7 is a flowchart for describing a process procedure of data writing to specific area 34 of the semiconductor memory apparatus according to a second embodiment of the present invention.

FIG. 7 is a flowchart for describing a process procedure of data writing to specific area 34 of the semiconductor memory apparatus according to the second embodiment of the present invention. First, when a specific area write dedicated command is input from MCU 1 (S51), the command is interpreted by WSM 26.

Next, the data to be compared with the data stored in specific area 34, such as a password, is output from MCU 1, and the data is sequentially stored in page buffer 28 (S52). Comparing circuit 37 sequentially reads the data stored in specific area 34, and compares it with the data stored in page buffer 28 (S53).

If matching of the contents of specific area 34 is not recognized, i.e., if authentication is failed (S53, NG), data writing is aborted (S54). On the other hand, if matching of the contents of specific area 34 is recognized, i.e., if authentication is succeeded (S53, OK), the data to be written to specific area 34, such as a password, is output from MCU 1, and the data is sequentially stored in page buffer 28 (S55).

Writing circuit 39 sequentially writes data stored in page buffer 28 to memory mat 34. When writing to memory mat 34 is normally completed, MCU 1 reads the status stored in status register 32 and ends the process (S56).

Figure 8:
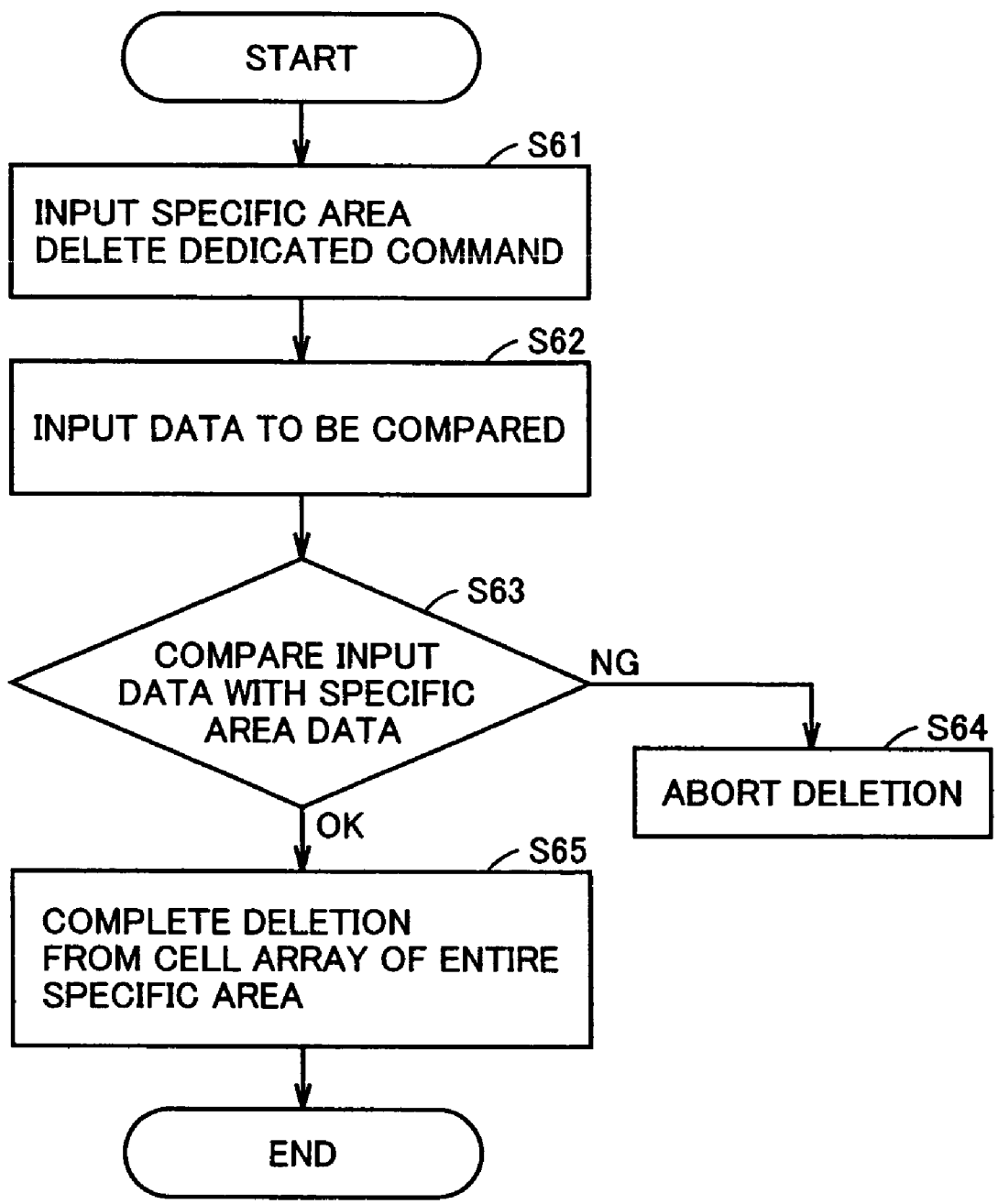
FIG. 8 is a flowchart for describing a process procedure of data deletion from specific area 34 of the semiconductor memory apparatus according to the second embodiment of the present invention.

FIG. 8 is a flowchart for describing a process procedure of data deletion from specific area 34 of the semiconductor memory apparatus according to the second embodiment of the present invention. First, when a specific area delete dedicated command is input from MCU 1 (S61), the command is interpreted by WSM 26.

Next, the data to be compared with the data stored in specific area 34, such as a password, is output from MCU 1, and the data is sequentially stored in page buffer 28 (S62). Comparing circuit 37 sequentially reads the data stored in specific area 34, and compares it with the data stored in page buffer 28 (S63).

If matching of the contents of specific area 34 is not recognized, i.e., if authentication is failed (S63, NG), data deletion is aborted (S64). On the other hand, if matching of the contents of specific area 34 is recognized, i.e., if authentication is succeeded (S63, OK), data writing circuit 39 starts data deletion from specific area 34. When data deletion from memory mat 34 is normally completed, MCU 1 reads the status stored in status register 32 and ends the process (S65).

As described above, according to the semiconductor memory apparatus according to the present embodiment, comparing circuit 37 compares the data stored in specific area 34 with the data received from MCU 1 and stored in page buffer 28 when executing the specific area write dedicated command or the specific area delete dedicated command, and performs data writing to specific area 34 or data deletion from specific area 34 only if matching is found. Therefore, as compared to the effect attained by the first embodiment of the present invention, the security of semiconductor memory 2 can further be enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor memory, comprising:
   a specific storage area provided separately from a normal storage area and that is inaccessible to be read from outside;
   a buffer storing information input from the outside;
   a comparing portion comparing security information stored in said specific storage area with information stored in said buffer; and
   an output portion outputting a comparison result by said comparing portion to the outside as a status.

2. The semiconductor memory according to claim 1, further comprising
   a data write permitting portion permitting data writing to said specific storage area when matching is detected by said comparing portion.

3. The semiconductor memory according to claim 1, wherein
   said semiconductor memory is a non-volatile memory, and further comprises a data delete permitting portion permitting data deletion from said specific storage area when matching is detected by said comparing portion.

4. A semiconductor memory, comprising:
   a specific storage area provided separately from a normal storage area and that is inaccessible to be read from outside;
   a buffer storing information input from the outside;
   a comparing portion comparing security information stored in said specific storage area with information stored in said buffer; and
   a control portion stopping part of an operation of said semiconductor memory when matching is not detected by said comparing portion.

* * * * *